(12) United States Patent
Gannon

(10) Patent No.: US 7,176,937 B2
(45) Date of Patent: Feb. 13, 2007

(54) METHODS AND APPARATUS FOR DISPLAYING MULTIPLE DATA CATEGORIES

(75) Inventor: Aaron James Gannon, Anthem, AZ (US)

(73) Assignee: Honeywell International, Inc., Morristown, NJ (US)

( * ) Notice: Subject to any disclaimer, the term of this patent is extended or adjusted under 35 U.S.C. 154(b) by 679 days.

(21) Appl. No.: 10/669,194

(22) Filed: Sep. 23, 2003

(65) Prior Publication Data

US 2005/0066275 A1 Mar. 24, 2005

(51) Int. Cl.
*G09G 5/02* (2006.01)
*G09G 5/10* (2006.01)

(52) U.S. Cl. .................. 345/592; 345/593; 345/690

(58) Field of Classification Search ............. 345/204, 345/690–699, 589–605; 348/603, 642, 645, 348/649; 382/162–163, 167
See application file for complete search history.

(56) References Cited

U.S. PATENT DOCUMENTS

| | | | |
|---|---|---|---|
| 4,868,552 A * | 9/1989 | Chang | 345/641 |
| 5,258,747 A * | 11/1993 | Oda et al. | 345/602 |
| 5,265,024 A * | 11/1993 | Crabill et al. | 701/200 |
| 5,867,169 A * | 2/1999 | Prater | 345/604 |
| 5,926,401 A | 7/1999 | Montag et al. | |
| 6,128,022 A * | 10/2000 | Dillinger | 345/591 |
| 6,177,945 B1 | 1/2001 | Pleyer | |
| 6,466,224 B1 * | 10/2002 | Nagata et al. | 345/592 |
| 6,496,194 B1 * | 12/2002 | Mikoshiba et al. | 345/596 |
| 6,542,162 B1 * | 4/2003 | Hrusecky et al. | 345/629 |
| 6,771,813 B1 * | 8/2004 | Katsuyama | 382/165 |
| 6,917,371 B1 * | 7/2005 | Nagoshi et al. | 345/640 |
| 6,980,220 B1 * | 12/2005 | Politis | 345/592 |
| 2002/0122036 A1 * | 9/2002 | Sasaki | 345/422 |

FOREIGN PATENT DOCUMENTS

| | | |
|---|---|---|
| AU | 200010032 B2 | 11/2000 |
| DE | 3937688 A1 | 5/1990 |
| JP | 2000010473 | 6/1998 |
| WO | WO 02/084219 A2 | 10/2002 |

OTHER PUBLICATIONS

PCT International Search Report PCT/US2004/031117 Nov. 30, 2005.
J. Theeuwes, Abrupt Luminance Change Pops Out; Abrupt Color Change Does Not, 1995, pp. 637-644, TNO Human Factors Research Institute. Soesterberg. The Netherlands.
B.L. Harrison, K.J. Vicente, An Experimental Evaluation Of Transparent Menu Usage, 1996, pp. 391-398, Toronoto, Ontario, Canada.

* cited by examiner

*Primary Examiner*—Richard Hjerpe
*Assistant Examiner*—M. Fatahiyar
(74) *Attorney, Agent, or Firm*—Ingrassia Fisher & Lorenz

(57) ABSTRACT

Methods and apparatus are provided for displaying data categories each having a plurality of data subcategories. The apparatus comprises a display having a current luminous output capacity that is configured to produce a first visual presentation of first data subcategories and a second visual presentation of second data subcategories and a processor that is configured to control the display. The first data subcategories include one category displayed at ninety percent of the current luminous output capacity and other subcategories having a luminance difference of at least thirty percent of the current luminous output capacity. Second data subcategories have a common luminance that is thirty percent to sixty percent of the luminous output capacity of said display, a color saturation that is greater than seventy-five percent, and a transparency of at least forty percent.

27 Claims, 6 Drawing Sheets

METHODS AND APPARATUS FOR DISPLAYING MULTIPLE DATA CATEGORIES

FIELD OF THE INVENTION

The present invention generally relates to displaying multiple data categories, and more particularly to methods and apparatus for displaying multiple flight data categories of a vehicle such as an aircraft.

BACKGROUND OF THE INVENTION

A display provides a visual presentation of information. The visual presentation of information with a display can include representations of multiple data categories. For example, multiple data categories corresponding to sensors and systems of an aircraft can be visually presented to a vehicle operator with a display. The multiple data categories can be any number of classes or divisions in a classification scheme of information that are to be visually represented on a display, such as navigation data (e.g., navigation aid or NAVAID data, airport data, fix data, lateral/vertical/time flight plan route data, communication frequency data, latitude and longitude data, Grid Minimum Off-Route Altitude (Grid MORA) data, air traffic control and boundary data, magnetic variation data, time zone data, approach and departure chart data, airport diagram data, city data, road data, railroad data, elevation contour line data, river data, lake data, uplink weather data, winds aloft data, airspace data, airway data and absolute terrain data, or the like) and sensor data (e.g., airborne weather data, Automatic Dependent Surveillance—Broadcast (ADS-B) data, obstacle data, traffic sensor data or Traffic alert and Collision Avoidance System (TCAS), relative terrain data and Enhanced Ground Proximity Warning System (EGPWS) data).

Displays have continued to advance in sophistication and have achieved increasingly higher levels of information density that enable the visual presentation of a greater number of data categories. These advancements provide the visual display of multiple data categories that can be readily assimilated by an operator and/or user of the display and can also provide a reduction in unnecessary information to ease the task of perceiving and understanding a data category of interest. However, as the information density continues to increase, methods and apparatus are desirable that visually display the data categories in a manner that provides proper cognitive mapping between the operator and/or user of a display and also reduces the effort of the operator and/or user in assimilating one or more of the data categories of interest.

In view of the foregoing, it should be appreciated that it would be desirable to provide an apparatus for displaying multiple data categories. In addition, it should be appreciated that it would be desirable to provide a method for displaying multiple data categories. Furthermore, additional desirable features will become apparent to one skilled in the art from the drawings, foregoing background of the invention, and the following detailed description of the invention.

BRIEF SUMMARY OF THE INVENTION

An apparatus is provided for displaying a plurality of data categories each having a plurality of data subcategories. The apparatus includes a display with a current luminous output capacity that is configured to concurrently produce a first visual presentation of a first data subcategory and a second data subcategory of a first data category of the plurality of data categories and a second visual presentation of a fourth data subcategory and a fifth data subcategory of a second data category of the plurality of data categories. The apparatus also includes a processor that is configured to control the display during the concurrent production of the first visual presentation and the second visual presentation to generate a luminance difference between the first and second data subcategories and a common luminance for the fourth and fifth data subcategories. The luminance difference between the first data subcategory and the second data subcategory is at least thirty percent (30%) of the current luminous output capacity of the display, and one of the first data subcategory and the second data subcategory has a luminance greater than or equal to ninety percent (90%) of the current luminous output capacity of the display. The common luminance for the fourth data subcategory and the fifth data subcategory that is thirty percent (30%) to sixty percent (60%) of the luminous output capacity of the display. The fourth and fifth data subcategories also have a color saturation that is greater than seventy-five percent (75%), and a transparency of at least forty percent (40%) to provide at least partial visibility of the first and second data subcategories.

A method is provided for displaying data from a plurality of data categories each having a plurality of subcategories. The method includes the steps of concurrently generating first and second particular visual presentations on a display and illuminating each of the first visual presentations concurrently with illuminating the second visual presentation. The first visual presentation is of a first data subcategory and a second data subcategory of a first data category of the plurality of data categories, the step of generating a first visual presentation includes the step of assigning display parameters to the first data subcategory and the second data subcategory. Generating the first visual presentation and further includes the steps of determining a current luminous output of a display, assigning one of the first data subcategory and the second data subcategory a luminance greater than ninety percent (90%) of the current luminous output of the display, and assigning a luminance difference between the first data subcategory and the second data subcategory of at least thirty percent (30%) of the current luminous output capacity of the display. The second visual presentation is of a fourth data subcategory and a fifth data subcategory of a second data category of the plurality of data categories. The step of generating a second visual presentation includes assigning display parameters to the data of the fourth data subcategory and the fifth data subcategory, which include assigning the fourth data subcategory and the fifth data subcategory a common luminance that is different from at least one luminance of the first data subcategory and the second data subcategory by at least thirty percent (30%) of a current luminous output capacity of the display, assigning one common color saturation greater than seventy-five percent (75%) to the data subcategories in the second data category, and assigning one common transparency of at least forty percent (40%) to the data subcategories in the second data category.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Figure 1:
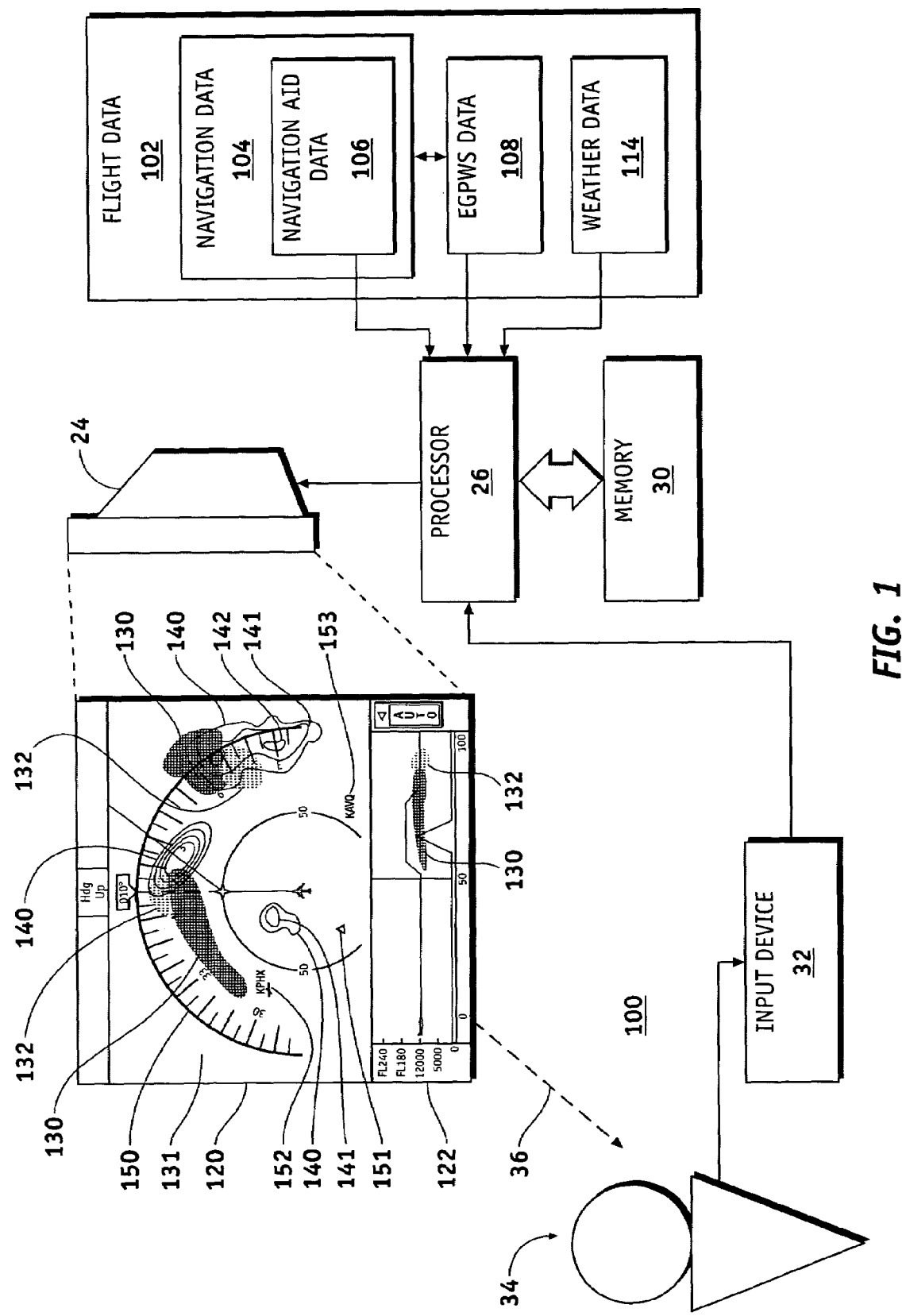
FIG. 1 is an apparatus for displaying data categories according to an exemplary embodiment of the present invention.

Referring to FIG. 1, an apparatus 100 is illustrated for displaying visual objects 130–132, 140–142, and 150–152 representing data from a plurality of flight data categories (130s, 140s, and 150s) including weather data 114, Enhanced Ground Proximity Warning System (EGPWS) data 108, and navigation aid data 106, according to a preferred exemplary embodiment of the present invention. The apparatus 100 comprises a display 24 that is configured to produce visual presentations of the data from the three data categories. The display 24 can be any known or future display that is suitable for producing visual presentations of the data from a plurality of data categories and is preferably a multi-color display. For example, the display 24 can be a color Cathode Ray Tube display (CRT), monochrome CRT display, Liquid Crystal Display (LCD), plasma display, Flat-Panel Display (FPD), electro-luminescent display, vacuum fluorescent display, Heads-Up Display (HUD), Heads-Down Display (HDD), Helmet Mounted Display (HMD), Light Emitting Diode (LED) display or the like.

In addition to the display 24, the apparatus 100 of the present invention also comprises a processor 26 that is configured to control the display 24 during production of the visual presentations of the visual objects 130–132, 140–142, and 150–152 representing data from multiple respective data categories (130s, 140s, and 150s). The processor 26 preferably encompasses one or more functional blocks and can include any number of individual microprocessors, memories, storage devices, interface cards, and other processor components. The processor 26 is configured to receive and/or access the data categories and also communicate with an input device 32, which can be any device suitable for accepting input from a user 34, such as a cursor control device (e.g., touch-pad, joystick, mouse, trackball), for example. The user 34 (e.g., an aircraft pilot and/or navigator) preferably provides input to the processor 26 with the input device 32 and receives visual feedback 36 from the display 24 of the visual presentations of the plurality of visual objects representing the data categories. Processor 26 may control display 24 to present a multi-function display (MFD) 101, which may comprise a lateral display 120 and a vertical situation display 122.

Although illustrated as flight data 102 in a preferred exemplary embodiment, the data categories can be any number of classes or divisions in a classification scheme of information. As mentioned above, the data categories 130s, 140s, and 150s in this detailed description of a preferred exemplary embodiment will be weather data 130s, Enhanced Ground Proximity Warning System (EGPWS) data 140s, and navigation aid data 150s of an aircraft (not shown). However, various numbers of data categories can be visually presented according to the present invention instead of the illustrated categories of flight data 102. The flight data 102 can be comprised of various data categories such as airborne weather data 114, Automatic Dependent Surveillance—Broadcast (ADS-B) data, obstacle data, traffic sensor data or Traffic alert and Collision Avoidance System (TCAS), relative terrain data and Enhanced Ground Proximity Warning System (EGPWS) data 140s, and the navigation data 104 which can be comprised of data categories such as navigation aid or NAVAID data 106, airport data, fix data, lateral/vertical/time flight plan route data, communication frequency data, latitude and longitude data, Grid Minimum Off-Route Altitude (Grid MORA) data, air traffic control and boundary data, magnetic variation data, time zone data, approach and departure chart data, airport diagram data, city data, road data, railroad data, elevation contour line data, river data, lake data, uplink weather data, winds aloft data, airspace data, airway data and absolute terrain data, or the like. In addition, the present invention is applicable to other displays of an aircraft and displays for other land, water, and air or space vehicles. For example, the display 24 may be used at a control station for a remotely piloted vehicle (RPV). Furthermore, the present invention is also applicable in non-vehicle applications. For example, the present invention is applicable to simulators, Computer Aided Design (CAD) systems, video games, control systems of stationary objects, medical diagnostic devices, weather forecasting systems and laptop and desktop computers that utilize a display for visual presentation of data categories.

The processor 26 is configured to control the display 24 for concurrent production of multiple visual presentations (e.g., a first visual presentation, . . . , and Nth visual presentation, where N is greater than or equal to two (2)). The concurrent production of multiple visual presentations in the following example shall be the concurrent production of EGPWS data (140s, or first category) and airborne weather data 114 (130s, or second category). However, as previously described in this detailed description of the invention, more than two data categories can be produced on the display 24 in accordance with the present invention, and other data categories other than the airborne weather data 114 and EGPWS data 108 (140s category) can be produced in accordance with the present invention. For example, navigation aid data 106 (150s category) may be data in a third category. It will be appreciated that the visual presentations of the present invention, which allow the user 34 to discriminate data categories based on displayed luminance and color saturation, may also be used in conjunction or disjunction with other visual discriminators such as color, including various parameters of any selected color model, and transparency. Conjunctive and disjunctive use of additional visual discriminators may be used to expand the number of visually distinct data categories beyond the number that may be discriminated by luminance and color saturation alone.

The production of the multiple data categories on the display 24 under the control of the processor 26 presents visual presentations of the data categories to the user 34 in a manner that preferably assists with the cognitive mapping between the display 24 and the user 34 and/or reduces the time, error and/or effort of the user 34 in assimilating at least one data category of interest. While the discussion herein relates primarily to displaying data from multiple categories on a lateral display 120, it will be appreciated that multiple categories of data may also be presented on a VSD 122, or the like. It will also be appreciated that, at some times during the operation of the exemplary embodiment, one or more categories or subcategories thereof may be empty and that for some alternate embodiments, fewer than the maximum number of categories or subcategories may be displayed.

Figure 2:
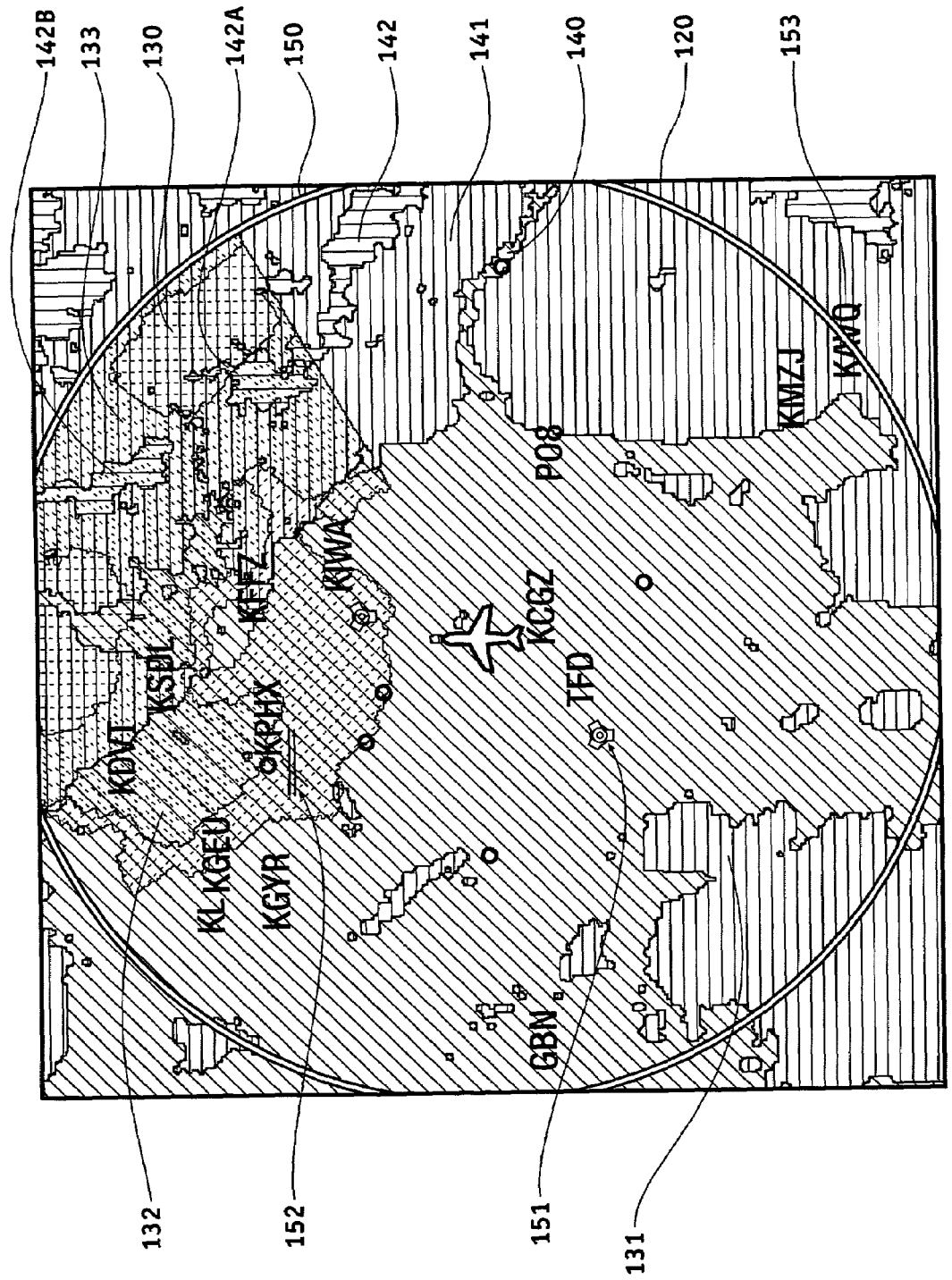
FIG. 2 is the display of FIG. 1 that is concurrently producing visual presentations of data categories under the control of the processor of FIG. 1 according to an exemplary embodiment of the present invention.

Referring to FIG. 2, a lateral display 120 produced by display 24 is shown producing visual presentation of visual objects, or objects, 140–142 representing EGPWS data 140s (i.e., a first visual presentation of a first data category (140s)) and a visual presentation of visual objects 130–133 representing airborne weather data 114 (i.e., a second visual presentation of a second data category (130s)) according to one exemplary embodiment of the present invention. The visual presentations of the airborne weather data 114 and EGPWS data 108, including the formation of visual objects 130–132 and 140–142, are produced by the display 24 under the control of the processor 26 as shown in FIG. 1. The processor 26 can be an integrated component of the display 24, a separate and distinct unit from the display 24, or a combination of integrated component and separate and distinct unit.

The processor 26 as shown in FIG. 1 is configured to control the display 24 during concurrent production of the visual presentations of the airborne weather data 114 and the EGPWS data 108 such that the presentation of the airborne weather data 114 comprises one or more translucent regions overlaid on a relative terrain map representation of EGPWS data 108. The translucent regions, or partially transparent or partially opaque regions, represent various subcategories of the airborne weather data 114. In addition, the processor 26 as shown in FIG. 1 is preferably configured to control the display 24 such that the presentation of the airborne weather data 114 (e.g., the second data category) comprises a plurality of visual objects 130–133, displayed as regions of different color or shading. Each data subcategory has one or more visual objects to represent its data. Visual object 130 may have a red hue or dark shading to connote severe weather, such as a high rate of rainfall. Area 131 defines a region of no adverse weather, is transparent, and may be visualized as defining what is absent. In some embodiments, area 131 may not be an object. The object 131 may be represented by omission of airborne weather data 114. Visual object 132 may be, for example, green or lightly shaded to represent an area of weather of minor concern, such as a low rate of rainfall, and visual object 133 may be yellow or have intermediate shading to represent weather of intermediate concern, such as a moderate rate of rainfall. Weather data other than rain fall, such as wind velocities, hail, regions of lightning activity, and the like, may be displayed.

Color or shading may be used to additionally discriminate visual objects within a data category. The EGPWS data 108 is represented by a three-color aircraft-relative terrain map showing objects 142 representing regions of a first altitude band, such as 500 feet to 2000 feet below the aircraft in a first color, such as brown. Objects 140, representing regions in a second altitude band, such as 500 feet below to 2000 feet above the aircraft, are presented in a second color, such as tan. Objects 141, representing regions in a third altitude band, such as more than 2000 feet above the aircraft, are presented in a third color, such as white. Other or additional altitude bands may be defined as objects representing EGPWS data 108 in the 140s category. Data for each altitude band makes up a subcategory of EGPWS data 108. The colors and shades shown and described are merely exemplary. A variety of color or shading schemes for objects representing subcategories within a category are possible. The color difference, or Delta E, between colors within a category is at least one, is preferably greater than 25, and more preferably greater than 100 and less than 280. Likewise, the Delta-E between color schemes of different categories is at least one, preferably greater than 25, and more preferably greater than 100 and less than 280.

In a preferred exemplary embodiment, a common luminance assigned to objects (130–133) in the weather category (130s) is less than the highest luminance assigned to objects (140–142) in the EGPWS category (140s). The relative luminances should allow the EGPWS objects to be visually distinguishable from weather data objects. The difference in luminance between categories may be defined in terms of the current luminous output capability of the display 24. Display 24 has an adjustable luminance, or brightness, control (not shown), which may be manually and/or automatically controlled to compensate for ambient cockpit lighting conditions (bright sunlight, night, etc.). The luminance output capability of the display is a measure of the amount of light emitted from the display 24. The luminance control on display 24 sets the current luminous output capability (CLOC) of display 24 by changing the maximum amount of light that may be emitted from the display 24. In a preferred exemplary embodiment, the difference in luminance between two subcategories of data is nominally at least 30% of the CLOC (0.30*CLOC). This allows for a maximum of four data subcategories to be visually discriminated based solely on luminance, which is the power per unit area of the light energy leaving the display 24 from any defined area. In a particular exemplary embodiment, luminances of 0.12*CLOC, 0.62*CLOC, and 1.00*CLOC are used to differentiate between visual objects representing three subcategories of EGPWS data, where "*" denotes multiplication A fourth luminance, 0.32*CLOC, may be used for all subcategories of the second data category. In that same particular exemplary embodiment, color saturations of 80%, 30%, 5%, respectively, are used for the EPGWS, respectively. Other preferred embodiments have luminance ranges of 90%–100%, 45%–65%, and 1–10% with respective color saturations of 0%–10%, 20%–40%, and 40%–50%, respectively. In another particular exemplary embodiment, the CLOC is not adjustable.

In accordance with a preferred exemplary embodiment of the present invention, the visual presentation of the EGPWS data 108 (e.g., the first data category) produced by the display 24 under the control of the processor 26 as shown in FIG. 1, preferably comprises a first shaded, or colored-in, area 140 for at least a portion of a first object of a first data subcategory representing the EGPWS data 108. In addition, the processor 26 as shown in FIG. 1 is preferably configured to control the display 24 such that the presentation of the EGPWS data 108 comprises a second shaded area 141 for at least a portion of a second visual object representing a second subcategory of the EGPWS data, and a third shaded area 142 for at least a portion of a third visual object representing a third subcategory of the EGPWS data. While the presentation of the EGPWS data 108 comprises the first shaded area 140, second shaded area 141, and third shaded area 142 for at least a portion of the first object, second object, and third object, respectively, the EGPWS data 108 preferably comprises a first shaded area 140, second shaded area 141, and third shaded area 142 for a majority of the first object, second object, and third object of the EGPWS data 108, respectively, and even more preferably a shaded area for substantially all or all of the first object, second object, and third object of the EGPWS data 108, respectively.

In the example of FIG. 2, the first object represented by the first shaded area 140 is a first altitude range with respect to the aircraft, the second object represented by the second shaded area 141 is a second altitude range with respect to the aircraft, and the third object represented by the third shaded area 142 is a third altitude range with respect to the aircraft. However, any number of objects of a data category can be represented by a shaded area, and a fewer number or greater number of shaded areas can be used to designate a fewer number or greater number of objects in accordance with the present invention. The visual presentation of the objects (140–142) for the EGPWS data 108 (e.g., the first data category) provides a visual presentation on the display 24 from which the user can determine the existence of each of the objects (140–142) and, as will be discussed further in this detailed description of the invention, the translucent visual objects (130-133) representing the weather data 114 category (e.g., the second data category) present minimal interference with viewing the visual objects (140–142) of the EGPWS data 108. For example, mountain top regions represented by objects 142a and 142b (representing portions of the third altitude range of EGPWS data) can be seen through translucent visual objects 130 and 133, respectively.

In other embodiments, objects 130–133 may be opaque or may change to opaque when there are no objects representing EGPWS data 108, or for other reasons, such as focusing the attention of the user 34 on the objects representing weather data 114. In another embodiment, luminance relationships and other display relationships between categories may reverse or otherwise be shifted, depending upon the situational relative importance of the data. For example, if the user 34 is flying in light rain and is about to engage terrain, the terrain data may be made more luminous than the weather data.

In accordance with another embodiment of the present invention, additional characteristics are provided for the area shading in order to distinguish between objects of one data category or data objects of different categories. For example, each of the different shaded areas (140–142, 130–133) can be shaded a unique color. The colors used for the objects representing different subcategories of a single data category are preferably unique colors, and the colors used for the objects of multiple data categories are preferably unique colors. As discussed above, the color difference Delta E should preferably be one hundred for colors within and colors between categories. For example, the first object 140 can be brown, the second object 141 can be tan, and the third object 142 can be white. However, any number of colors can be used for the color of the objects (140–142) in accordance with the present invention.

To provide additional visual discrimination between objects of different subcategories and between different categories, the objects of each category or subcategory may have a color saturation level different from the color saturation level of at least one other subcategory. For example, the EGPWS data 108 may be represented by objects having a low color saturation level, giving the objects representing the EGPWS data 108 a subdued appearance, and the weather data 114 may have a high color saturation level, giving the objects 130–133 a bright vivid appearance. As discussed above, the color saturation difference and the luminance difference are combined to achieve visually discriminated data categories 130s and 140s. A color saturation of 100% for visual objects representing the weather data 114 is used in an exemplary preferred embodiment. Other embodiments may have color saturations for the translucent visual objects of the weather data category (the 130s category) of between 75% and 100%, with 85% to 100% being more preferred and 95%–100% being most preferred.

A third category (the 150s) is also illustrated in FIG. 2 which shows navigation aid data 106 displayed as exemplary visual objects 150–152. The third category may contain any type of displayable data, and navigation aid data 106 is merely exemplary. Visual objects 150–153 comprise symbols including a range circle 150, a navigation beacon 151, an airport symbol 152, and an alphabetic airport designator 153. Other navigation aid data 106 may be additionally or alternatively displayed. The 150s category exemplifies visual objects in the form of symbols added to visual objects representing areas (140–142) or regions (130–133).

As illustrated in FIG. 2, the visual objects representing weather data 114 are translucent and superimposed on the visual objects representing navigation aid data 106. In a preferred exemplary embodiment, the navigation aid data 106 may be a top display layer. It will be appreciated that display layer data is included in display data along with, without exhaustion, color model data and pixel location. The color model data may include a discrete luminance parameter. It will be appreciated that there are many different color models for mathematically describing a color to an electronic display. For example, the RGB-alpha color model is in common use. Not all color models have a luminance parameter, per se. Rather, in some color models, luminance is affected by combinations of parameters. The method of the present invention is not limited to displays using color models that have a single parameter for luminance. The luminance may be indicated by a combination of color model parameters or may be independent of the color model.

Figure 3:
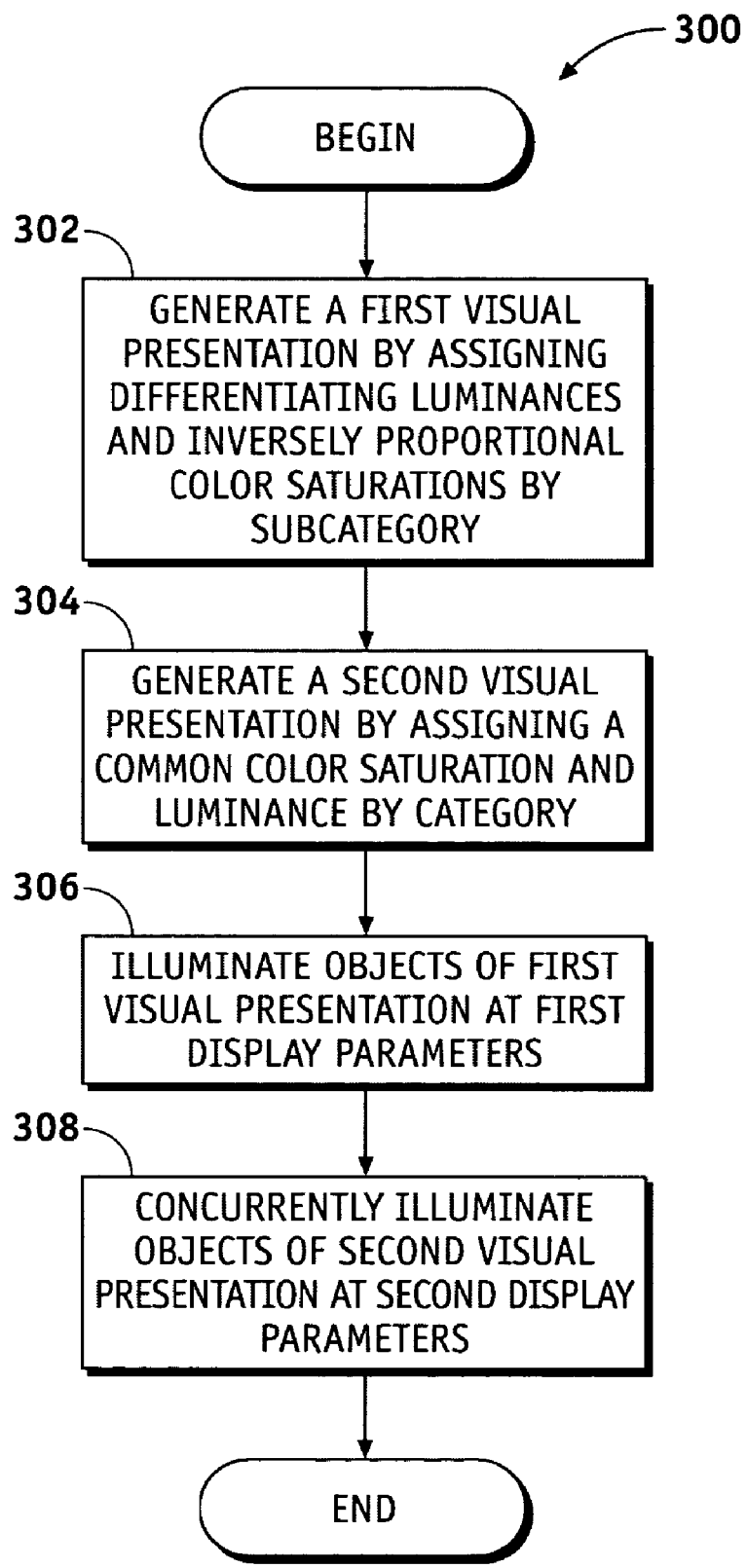
FIG. 3 is a flowchart illustrating a method of displaying multiple data categories according to an exemplary embodiment of the present invention.

Referring to FIG. 3 an exemplary method 300 for displaying data categories is illustrated according to an exemplary embodiment of the present invention. Additional details of the method 300 can be found as previously described in this detailed description of the invention. Furthermore, one or more of the steps subsequently described are optional, and the following steps can be used with other steps not implicitly or explicitly provided in FIG. 3.

The exemplary method 300 for displaying data categories comprises the step 302 which includes generating a first visual presentation of a first data category of the data categories by assigning first display parameters to each data subcategory of the first data category, including differentiating luminance parameters and also color saturation parameters inversely proportional to the luminance parameters. Step 304 includes generating a second visual presentation of a second data category of the data categories by assigning second display parameters to each data subcategory of the second data category, including a common luminance parameter and a common color saturation parameter. In a particular exemplary embodiment, the second data category is assigned a high saturation and a mid-range luminance. Second category data may be further differentiated by hue. Steps 302 and 304 are typically performed in processor 26 as shown in FIG. 1. In addition, the method 300 comprises the step 306 of illuminating objects of the first data category with using first display parameters and the step 308 of illuminating objects of the second data category using second display parameters. Illuminating an object includes displaying it on the display 24 as shown in FIG. 1. As previously discussed, luminance discriminates visual objects to a preferred extent when the difference between two luminances are at least 30 percent of the CLOC. For a display 24 (FIG. 1) with a non-adjustable luminance, method 300 may be sufficient.

Figure 4:
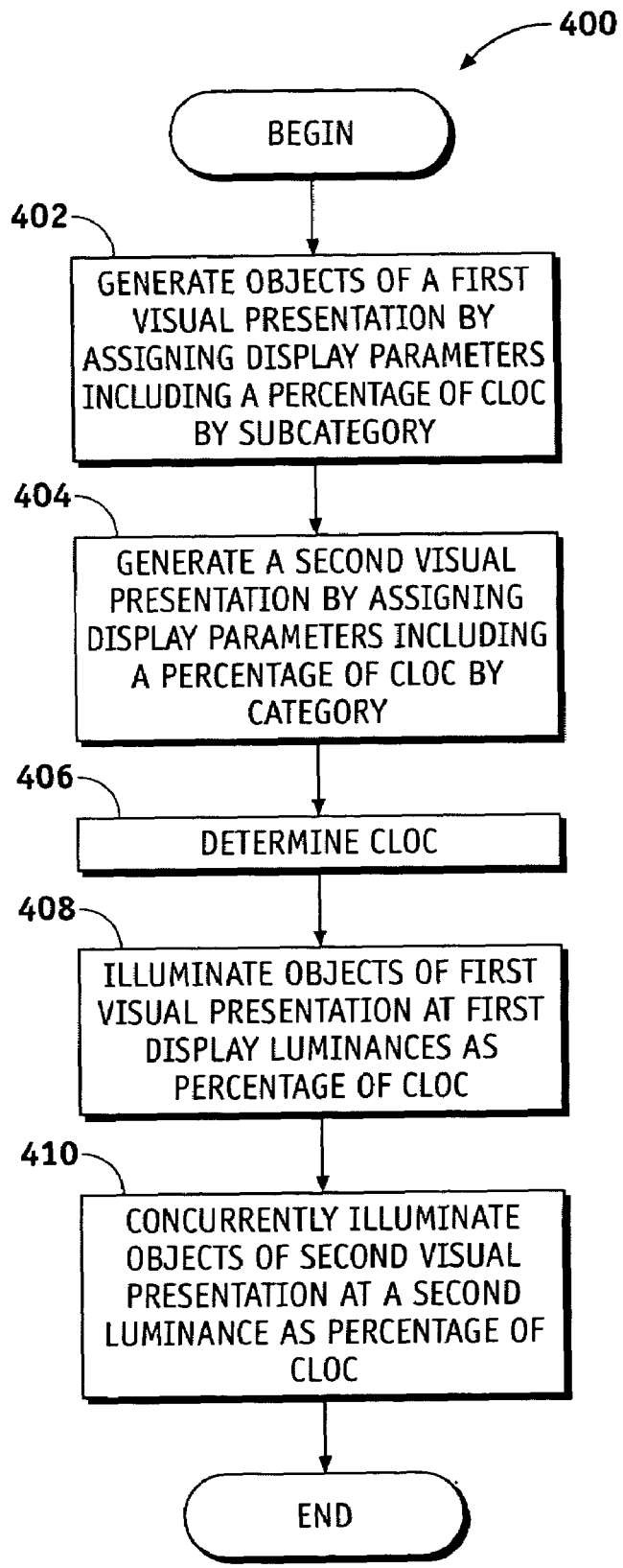
FIG. 4 is a flowchart illustrating another method of displaying multiple data categories according to another exemplary embodiment of the present invention.

For a display 24 with an adjustable luminance, exemplary method 400, as shown in FIG. 4, may be preferred. Processor 26 generates objects of the first visual presentation in step 402, including parameters giving percentages of the current luminance output capacity (CLOC) by subcategory within the first data category. Step 404 generates the objects of the second presentation, including assigning a parameter assigning a common percentage of the CLOC as a luminance parameter. In a preferred exemplary embodiment, the steps 402 and 404 use flight data 102 as shown in FIG. 1, which may include weather data 114, EGPWS data 108, navigation aid data 106 or other flight data 102 as previously described. Additional steps 402 and 404 for third and fourth visual presentations may be added to method 400 for additional data categories. In step 406, processor 26 determines the CLOC, which may be calculated as a function of the display 24 type and the current luminance, or brightness, setting. Each type and model of display 24 may have its own calibration curve indicating the relationship of a brightness control setting and a display 24 luminance which may be used as a basis of the calculation.

In step 408, the objects representing the data subcategories of the first visual presentation are illuminated on the display 24 at the first luminances provided in steps 402 and 406. The first luminances may be predetermined or may be selected by the user 34 using input device 32 as shown in FIG. 1. The objects of the second visual presentation are illuminated at a common luminance in step 410. The second luminance may be automatically calculated to be greater or less than one or more of the first luminances by an offset of at least 30 percent of the CLOC. Up to four luminances for up to four visual presentations may be determined in this way (e.g., 5%, 35%, 65%, and 95% of CLOC), but a scheme of three visual presentations discriminated by luminance (e.g., 12%, 62%, and 100% of CLOC) for the first data category is an exemplary preferred embodiment. It will be appreciated that the second data category is associated with a luminance parameter selected to avoid washing out the visual objects of the first data category.

Figure 5:
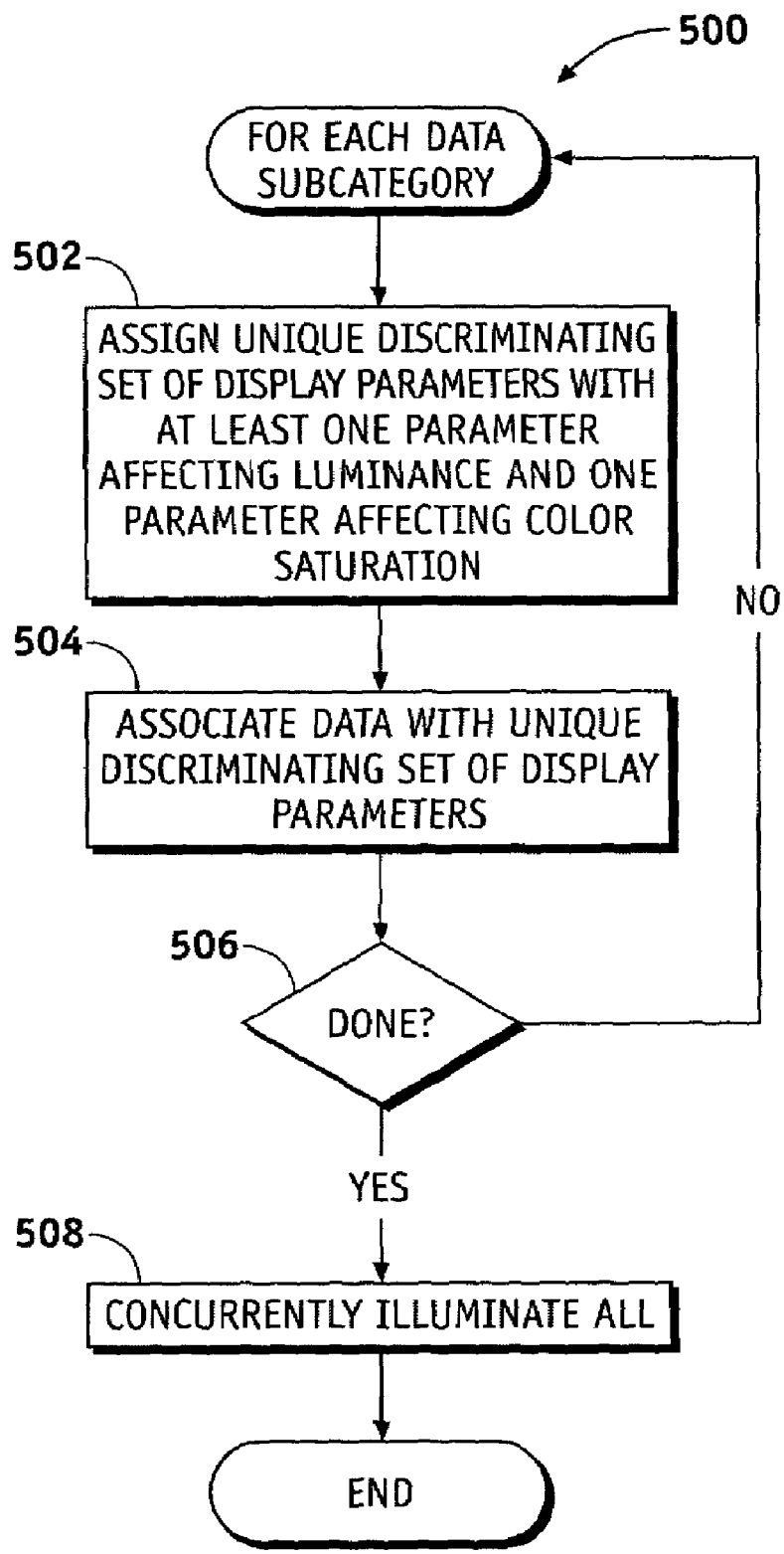
FIG. 5 is a flowchart illustrating yet another method of displaying multiple data categories according to yet another exemplary embodiment of the present invention.

An exemplary iterative method 500 of assigning display parameters to subcategories of the first data category and creating a visual presentation is shown in FIG. 5. For each data subcategory, a two-step approach is used. The first step 502 is to assign a unique and visually discriminating set of display parameters to each data subcategory. At least one of the display parameters affects luminance and at least one of the display parameters affects color saturation. Other display parameters may include a color model or other parameters of a color model and a layer parameter. Color model parameters may include, without limitation, color saturation, transparency/opacity, and hue. Perceived colors, or hues, for visual objects representing the first category must differ from hues for visual objects in other data categories by a color difference, or Delta-E, of at least one, preferably by at least twenty five, more preferably by a Delta-E of at least one hundred, and most preferably by a Delta-E of at least 250. The display parameters for the first data subcategory may be predetermined or may be selected by user 34 using input device 32 as shown in FIG. 1. The display parameters for the second and subsequent data subcategories may also be predetermined, may be selected by user 34 using input device 32 as shown in FIG. 1, or may be automatically calculated in processor 26 as a function of the previously determined display parameters for other data categories (not shown in FIG. 5) and other data subcategories.

In step 504, processor 26 associates the display parameters from step 502 with the data of the current subcategory to build the visual presentation. The visual presentation may be a data structure or stream at the end of step 504, containing, at least implicitly, at least one luminance parameter, at least one color saturation parameter, a layer parameter, and other display parameters as applied to the data of the data subcategory to be displayed. Steps 502 and 504 iterate under the control of step 506 until the visual presentation has been generated. When step 506 has determined that the visual presentation has been generated, the objects for each data subcategory may be concurrently illuminated in step 508 on display 24 according to the display parameters for each data subcategory. Illumination provides the user 34 with a constant view of visual objects representing the concurrently displayed objects of the data subcategories, but the display of the visual objects need not be strictly simultaneous. For example, in a dual-raster display, a first object representing a first data subcategory may be displayed on a first raster scan and a second visual object representing a second data subcategory may be displayed on a second raster scan to produce a constant image. In an alternate embodiment, the display parameters are determined iteratively and the visual presentations are generated in parallel thereafter.

Figure 6:
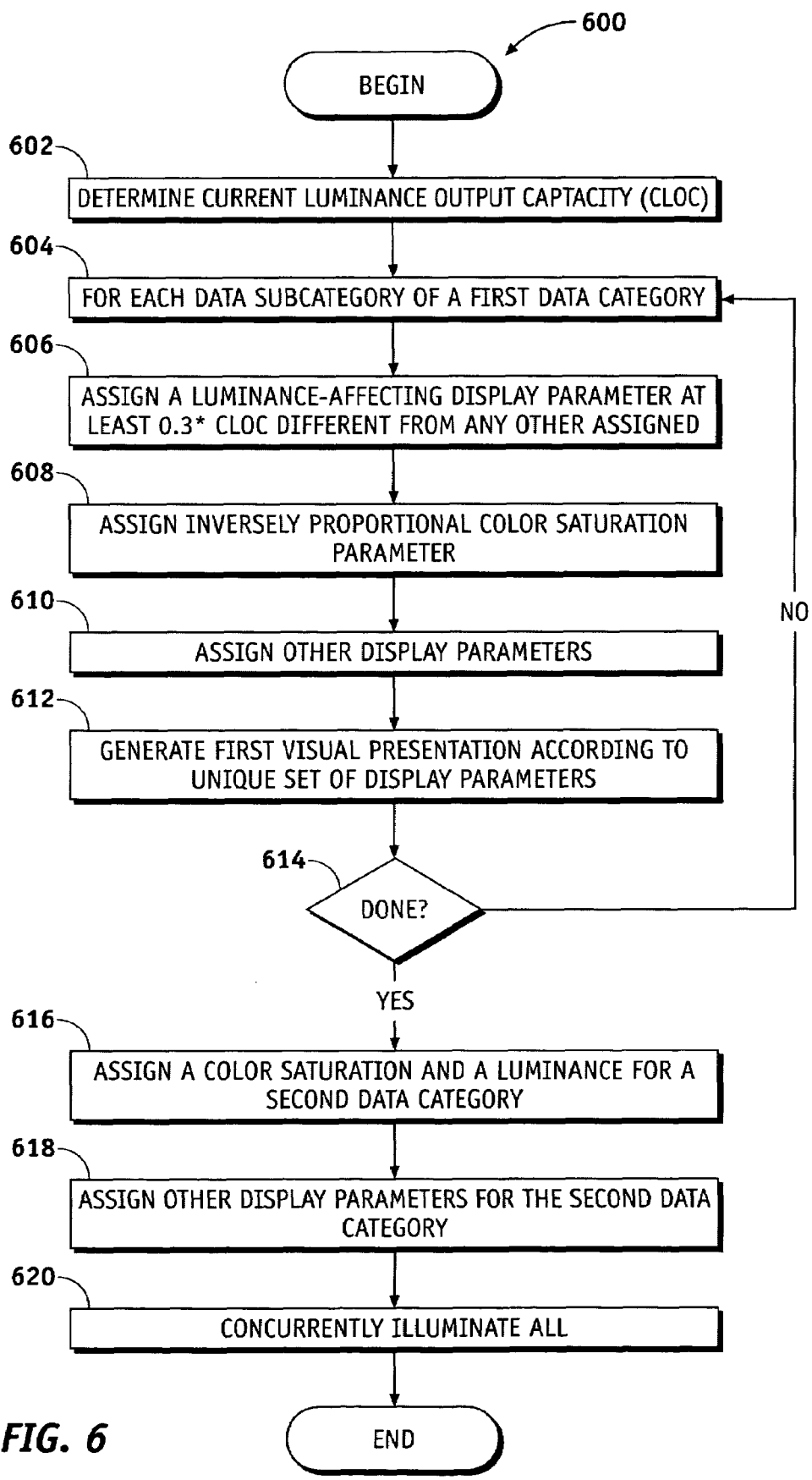
FIG. 6 is a flowchart illustrating still yet another method for displaying multiple data categories according to still yet another exemplary embodiment of the present invention.

FIG. 6 shows an exemplary iterative method 600 for practicing the present invention. In step 602, processor 26 determines the CLOC as previously discussed. Step 602 may need to be taken only at start-up and after any adjustment of the display 24 luminance. For each data subcategory of the first data category to be displayed, step 604 initiates a loop comprising steps 606, 608, 610, 612, and 614. In step 606, one or more luminance-affecting parameters are assigned to the data subcategory under consideration. For the first data subcategory, predetermined or operator-selected parameters may be assigned. For subsequent passes through the loop, the parameters may be functions of parameters previously assigned to other data subcategories, thereby ensuring visual discrimination among all data subcategories. In step 608, one or more parameters effective to produce a color saturation inversely proportional to the assigned luminance are assigned to the current subcategory. In addition to luminance, other display parameters, which may or may not assist in visual discrimination, are assigned to the data category under consideration in step 610. In step 612, the first visual presentation of the data in the data subcategory is sequentially generated by processor 26. When all data subcategories have contributed to the generation of the first visual presentation, as determined in step 614, step 616 assigns a common color saturation and a common luminance to the data subcategories of a second data category. Step 618 assigns the remaining display parameters for the data subcategories of the second category, which may include parameters to discriminate, such as by hue, between data subcategories of the second category. Step 618 may include generating the second visual presentation, which is then illuminated on the display concurrently with the first visual presentation in step 620.

From the foregoing description, it should be appreciated that methods and apparatus are provided for displaying multiple data categories that present significant benefits that have been presented in the summary of the invention and detailed description of exemplary embodiments, including a preferred exemplary embodiment. The preferred exemplary embodiment has a first data category with subcategories differentiated by luminance, inversely proportional color saturations, and hue and a second data category with subcategories differentiated from the first data category by transparency, high color saturations, and mid-range luminance and further differentiated by hue. The methods and apparatus for displaying multiple data categories also present significant benefits that would be apparent to one of ordinary skill in the art. Furthermore, while preferred exemplary embodiments have been presented in the foregoing description, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiment without departing from the spirit and scope of the invention as set forth in the appended claims.

What is claimed is:

1. An apparatus for displaying a plurality of data categories each having a plurality of data subcategories, the apparatus comprising:
    a display with a current luminous output capacity that is configured to concurrently produce a first visual presentation of a first data subcategory and a second data subcategory of a first data category of the plurality of data categories and a second visual presentation of a fourth data subcategory and a fifth data subcategory of a second data category of the plurality of data categories; and
    a processor that is configured to control said display during said concurrent production of said first visual presentation and said second visual presentation to generate:
        a luminance difference between the first data subcategory and the second data subcategory of at least thirty percent (30%) of the current luminous output capacity of said display, wherein one of the first data subcategory and the second data subcategory has a luminance greater than or equal to ninety percent (90%) of the current luminous output capacity of the display; and
        a transparency for the fourth data subcategory and the fifth data subcategory selected to provide at least partial visibility of said first and second data subcategories through said fourth and fifth data subcategories;
        a common luminance for the fourth data subcategory and the fifth data subcategory that is thirty percent (30%) to sixty percent (60%) of the luminous output capacity of said display; and
        a color saturation for the fourth data subcategory and the fifth data subcategory that is greater than seventy-five percent (75%).

2. The apparatus of claim 1, wherein said first data category further includes a third data subcategory and the processor is further configured to control said display to generate a luminance difference for said third data subcategory of at least thirty percent (30%) of the current luminous output capacity of said display relative to said first data subcategory and said second data subcategory.

3. The apparatus of claim 1, wherein the processor is configured to control said display to generate a color for each data subcategory of the first data category having a saturation that is inversely proportional to the luminance of said each data subcategory of the first data category.

4. The apparatus of claim 1, wherein said second data category further includes a sixth data subcategory and the processor is further configured to control said display to generate for said sixth data subcategory said common luminance, said color saturation greater than seventy-five percent (75%), and said transparency of at least forty percent (40%).

5. The apparatus of claim 1, wherein the processor is configured to control said display to generate a transparency in the range of forty percent (40%) to sixty percent (60%) for each data subcategory in said second data category.

6. The apparatus of claim 1, wherein the processor is configured to control said display to generate a color saturation of more than ninety-five percent (95%) for each data subcategory in said second data category.

7. The apparatus of claim 1, wherein the processor is configured to control said display to produce the first visual presentation on a first display layer and said second visual presentation on a second display layer superimposed upon said first display layer.

8. The apparatus of claim 1, wherein said processor is configured to control the display to generate a unique hue for each data subcategory.

9. The apparatus of claim 8, wherein said processor is configured to control said display to generate a color difference (Delta-E) between one (1) and two-hundred and eighty (280) between colors of different subcategories.

10. The apparatus of claim 9, wherein said processor is configured to control said display to generate each visual object corresponding to a data subcategory as an area having a boundary, and wherein the luminance, hue, opacity, layer, and color saturation of said each visual object is selected to enable visual discrimination of the boundary of said each data subcategory.

11. The apparatus of claim 1, wherein said first data category comprises EGPWS data and said second data category comprises weather data.

12. The apparatus of claim 1, further comprising a third category of said plurality of data categories, wherein said one or more subcategories of said third data category comprise one or more navigation aid symbols.

13. A method for displaying data from a plurality of data categories each having a plurality of subcategories, the method comprising the steps of:
    generating a first visual presentation of a first data subcategory and a second data subcategory of a first data category of the plurality of data categories, the step of generating a first visual presentation comprising the step of assigning display parameters to the first data subcategory and the second data subcategory and further comprising:
    determining a current luminous output of a display,
    assigning one of the first data subcategory and the second data subcategory a luminance greater than ninety percent (90%) of the current luminous output of the display,
    assigning a luminance difference between the first data subcategory and the second data subcategory of at least thirty percent (30%) of the current luminous output capacity of said display, and
    generating a second visual presentation of a fourth data subcategory and a fifth data subcategory of a second data category of the plurality of data categories concurrently with said generating of said first visual presentation of said first data subcategory and said second data subcategory, the step of generating a second visual presentation comprising assigning display parameters to said data of the fourth data subcategory and the fifth data subcategory, and further comprising:

assigning the fourth data subcategory and the fifth data subcategory a common luminance that is different from at least one luminance of the first data subcategory and the second data subcategory by at least thirty percent (30%) of a current luminous output capacity of the display;

assigning one common color saturation greater than seventy-five percent (75%) to said data subcategories in said second data category; and assigning a transparency to said data subcategories in said second data category selected to provide at least partial visibility of said first and second data subcategories through said fourth and fifth data subcategories; and illuminating each of said first visual presentations concurrently with illuminating said second visual presentation.

14. The method of claim 13, further comprising the step of assigning colors to said first data subcategory and said second data subcategory of the first data category having saturations that are inversely proportional to each different luminance, respectively.

15. The method of claim 13, wherein the step of generating a second visual presentation comprises assigning each data subcategory of the second data category a common luminance between thirty percent (30%) and sixty percent (60%) of the current luminous output capacity of the display.

16. The method of claim 13, wherein the step of generating a second visual presentation comprises assigning a transparency between forty percent (40%) and sixty percent (60%) to each data subcategory of the second data category.

17. The method of claim 13, wherein the step of generating a second visual presentation comprises assigning a first display layer to said first visual presentation and assigning a second display layer to said second visual presentation, wherein said second display layer is superimposed on said first display layer.

18. The method of claim 13, wherein each displayed data subcategory includes an area with a boundary, the steps of generating a first visual presentation and generating a second visual presentation comprising assigning to each data subcategory a hue, luminance, opacity, and color saturation together configured to cause each boundary of said first display layer to be differentially visible through said second layer.

19. The method of claim 13, wherein the step of generating a first visual presentation and a second visual presentation comprises assigning a color difference (Delta-E) of between one (1) and two-hundred and eighty (280) between colors of different subcategories.

20. The method of claim 13, wherein the step of generating a first visual presentation includes generating a presentation of a third data subcategory and assigning a luminance to said third data subcategory differing from the luminances of the first data subcategory and the second data subcategory by at least thirty percent (30%) of the current luminous output capacity of said display.

21. The method of claim 13, wherein the step of generating a second visual presentation includes generating a presentation of a sixth data subcategory and assigning said common luminance, said common color saturation, and a transparency to said sixth data subcategory to provide at least partial visibility of said data subcategories of said first data category through said sixth data subcategory.

22. The method of claim 13, further comprising the step of concurrently generating a third visual presentation of a third data category of said plurality of data categories.

23. The method of claim 22, wherein said third data category comprises navigation aid symbols.

24. A method for displaying on an aircraft cockpit display flight data from a plurality of flight data categories each having a plurality of flight data subcategories, the method comprising the steps of:

determining a current luminous output capacity of said aircraft cockpit display;

assigning a first unique set of display parameters to each flight data subcategory of said plurality of flight data subcategories in said first flight data category, wherein at least one said display parameter of said first unique set of display parameters affects luminance to display one particular said flight data subcategory of said plurality of flight data subcategories in said first flight data category with a luminance that is greater than ninety percent (90%) of the current luminous output capacity of said aircraft cockpit display;

wherein at least one said display parameter of said first unique set of display parameters affects luminance to display each flight data subcategory in said first flight data category other than said one particular flight data subcategory with a luminance differing from other flight data subcategories in said first flight data category by at least thirty percent (30%) of said current luminous output capacity of said aircraft cockpit display; and assigning a second unique set of display parameters to each flight data subcategory of said plurality of flight data subcategories in said second flight data category, wherein at least one display parameter of said second unique set of display parameters affects luminance to display each of said plurality of flight data subcategories in said second flight data category with a common luminance between thirty percent (30%) and sixty percent (60%) of the current luminous output capacity of said aircraft cockpit display; and wherein at least one said display parameter of said second unique set of display parameters affects transparency to display flight data subcategories in said second flight data category at a transparency selected to provide at least partial visibility of said data subcategories of said first data category through said data subcategories of said second data category.

25. The method of claim 24, wherein at least one said display parameter affects color saturation to display each of said plurality of flight data subcategories in said first flight data category at a color saturation that is inversely proportional to said luminance of said each flight data subcategory in said first flight data category, respectively.

26. The method of claim 24, further comprising the step of, for each of said plurality of flight data categories, illuminating a visual presentation of said flight data categories according to said unique set of display parameters.

27. The method of claim 24, further comprising the step of concurrently illuminating each said visual presentation on said aircraft cockpit display.

* * * * *